United States Patent [19]

Suga et al.

[11] Patent Number: 4,883,848

[45] Date of Patent: Nov. 28, 1989

[54] METHOD FOR PRODUCING AN OLEFIN POLYMER

[75] Inventors: Yoshinori Suga, Machida; Eiji Tanaka, Kawasaki; Yasuo Maruyama, Tokyo; Eiji Isobe, Yokohama, all of Japan

[73] Assignee: Mitsubishi Chemical Industries Limited, Tokyo, Japan

[21] Appl. No.: 320,859

[22] Filed: Mar. 6, 1989

Related U.S. Application Data

[63] Continuation of Ser. No. 51,592, May 20, 1987, abandoned.

[30] Foreign Application Priority Data

May 21, 1986 [JP] Japan ................................. 61-116732

[51] Int. Cl.$^4$ ........................... C08F 4/02; C08F 10/06
[52] U.S. Cl. ..................... 526/124; 502/125; 526/125; 526/351; 526/909
[58] Field of Search ......................................... 526/124

[56] References Cited

U.S. PATENT DOCUMENTS 4,451,688  5/1984  Kuroda et al. ...................... 526/124

FOREIGN PATENT DOCUMENTS 49467     4/1982  European Pat. Off. ............ 526/124
2453868  11/1980  France .
2516520   5/1983  France .
59-182806 10/1984 Japan ................................... 526/124
1564460   4/1980  United Kingdom ................ 526/125

OTHER PUBLICATIONS

Chemical Abstracts, vol. 94, No. 8, Apr. 1981, p. 26, Abstract No. 122300j, Jan. 28, 1980.
Chemical Abstracts, vol. 93, No. 22, Dec. 1980, p. 24, Abstract No. 205352h, Jul. 5, 1980.

*Primary Examiner*—Edward J. Smith
*Attorney, Agent, or Firm*—Oblon, Spivak, McClelland, Maier & Neustadt

[57] ABSTRACT

A method for producing an olefin polymer, which comprises polymerizing or copolymerizing an olefin in the presence of a catalyst comprising (a) a titanium-containing solid catalyst component and (b) an organic metal compound of a metal of Groups I–III of the Periodic Table, said solid catalyst component (a) being obtained by treating (A) a magnesium compound of the formula $Mg(OR^1)_n(OR^2)_{2-n}$ wherein each of $R^1$ and $R^2$ is an alkyl group, an aryl group or an aralkyl group, and n is $2 \geq n \geq 0$, with three compounds i.e. (B) an electron donative compound, (C) a silicon compound of the formula $Si(OR^3)_4$ wherein $R^3$ is an alkyl group, an aryl group or an aralkyl group and (D) a titanium compound.

9 Claims, No Drawings

METHOD FOR PRODUCING AN OLEFIN POLYMER

This application is a Continuation of application Ser. No. 051,592, filed on May 20, 1987, now abandoned.

The present invention relates to a method for producing an olefin polymer by polymerizing or copolymerizing an αolefin by means of a novel solid catalyst component. More particularly, the present invention relates to a method for the polymerization of an α-olefin such as ethylene, propylene, butene-1,4-methylpentene-1 or 3-methylbutene-1 by means of a catalyst comprising a novel carrier, including a catalyst component, an organometallic compound of a metal of Groups I–III and, if necessary, an electron donative compound, which is capable of providing a polymer having excellent stereo regularity and granularity with high polymerization activities.

Heretofore, a number of methods have been proposed for producing titanium-containing catalysts by using a halogenated magnesium compound, preferably magnesium chloride, as carrier-including catalysts suitable for the stereo regular polymerization of an αolefin having at least 3 carbon atoms, including Japanese Unexamined Patent Publications No. 16986/1973, No. 86482/1974, No. 108385/1975, No. 126590/1975 and No. 28189/1976.

Polymerization of an olefin by a titanium-containing catalyst wherein a magnesium compound of the formula:

$$Mg(OR^1)_n(OR^2)_{2-n} \quad (I)$$

wherein each of $R^1$ and $R^2$ which may be the same or different, is an alkyl group, an aryl group or an aralkyl group, and n is $2>n>0$, as used in the present invention, is employed as a catalyst, has been proposed in Japanese Examined Patent Publications No. 34098/1971, No. 1768/1972 and No. 42137/1972. However, none of such conventional proposals has been suitable for highly stereo regular polymerization of an α-olefin having at least 3 carbon atoms. Various attempts have been made to improve the stereo regularity by using the carrier represented by the formula I, and various proposals have been made including Japanese Unexamined Patent Publication No. 98076/1977 previously proposed by the present applicant and Japanese Unexamined Patent Publications No. 2580/1978, No. 43094/1978, No. 52710/1980, No. 26904/1981, No. 120711/1981 and No. 20603/1984. However, none of them has been fully satisfactory.

The present inventors have conducted extensive research on the method for the preparation of a titanium-containing solid catalyst wherein the carrier represented by the formula I is used, and on the method for polymerization by means of such a catalyst, and have finally arrived at the present invention.

The present invention provides a method for producing an olefin polymer, which comprises polymerizing or copolymerizing an olefin in the presence of a catalyst comprising (a) a titanium-containing solid catalyst component and (b) an organometallic compound of a metal of Groups I–III of the Periodic Table, said solid catalyst component (a) being obtained by treating (A) a magnesium compound of the formula $Mg(OR^1)_n(OR^2)_{2-n}$ wherein each of $R^1$ and $R^2$ is an alkyl group, an aryl group or an aralkyl group, and n is $2>n>0$, with three compounds i.e. (B) an electron donative compound, (C) a silicon compound of the formula $Si(OR^3)_4$ wherein $OR^3$ is an alkoxy group or an aryloxy group and (D) a titanium compound.

The afore-mentioned halogen-containing magnesium is hygroscopic or reactive with moisture, and therefore, it is highly advantageous to use the carrier of the formula I from the standpoint of the production of the catalyst.

Now, the present invention will be described in detail with reference to the preferred embodiment.

Specifically, the present invention provides a method for producing an olefin polymer, which comprises polymerizing or copolymerizing an olefin by using a titanium-containing catalyst which comprises (a) a solid catalyst component obtained by treating (A) the magnesium compound of the formula I with three compounds i.e. (B) an electron donative compound, (C) a silicon compound of the formula $Si(OR^3)_4$ and (D) a titanium compound, and (b) an organometallic compound of a metal of Groups I–III of the Periodic Table, as essential components, and which may further contain (c) an electron donative compound.

Specific examples of the magnesium compound (A) of the formula I to be used in the present invention, include a dialkoxymagnesium, a diaryloxymagnesium, a diaralkyloxymagnesium and an alkoxyaryloxymagnesium, such as $Mg(OCH_3)_2$, $Mg(OC_2H_5)_2$, $Mg(OC_3H_7)_2$, $Mg(OC_4H_9)_2$, $Mg(OC_6H_5)_2$, $Mg(OCH_2C_6H_5)_2$, $Mg(OC_6H_5)(OC_4H_9)$, $Mg(OC_2H_5)(OC_6H_5)$ and $Mg(OC_6H_4CH_3)_2$.

The electron donative compound (B) includes, tor example, an oxygen-containing compound, a phosphorus-containing compound, a sulfur-containing compound and a nitrogen-containing compound.

Among them, the oxygen-containing compound includes, for example, compounds represented by the formulas:

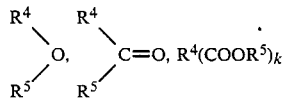

wherein each of $R^4$ and $R^5$ is a hydrocarbon group which may be substituted by an alkoxy group, or they may together form a cyclic group, and k is a number of from 1 to 3. More specifically, it includes an ether such as diethyl ether, dipropyl ether, diethylene glycol, polypropylene glycol, ethyleneoxide, propyleneoxide or furan; a ketone such as acetone, diethyl ketone, methyl ethyl ketone, methyl isobutyl ketone or phenyl propyl ketone; an ester of carboxylic acid such as ethyl acetate, methyl propionate, ethyl acrylate, ethyl oleate, ethyl stearate, ethyl phenylacetate, methyl benzoate, ethyl benzoate, propyl benzoate, butyl benzoate, methyl toluylate, ethyl toluylate, propyl toluylate, butyl toluylate, methyl ethylbenzoate, ethyl ethylbenzoate, ethyl xylenecarboxylate, methyl anisate, ethyl anisate, methyl ethoxybenzoate, ethyl ethoxybenzoate, ethyl ethoxybenzoate or ethyl cinnamate; and a cyclic ester such as γ-butyrolactone. Further, a silicon-containing ester such as β-trimethoxysilylethyl benzoate may also be used.

The phosphorus-containing compound includes compounds represented by the formulas:

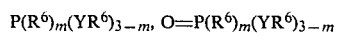

wherein R⁶ is a hydrogen atom, a hydrocarbon group, an amino group or an alkylamino group, Y is an oxygen atom or a sulfur atom, and m is a number of from 0 to 3. More specifically, it includes triphenylphosphineoxide, trimethylphosphine, triphenylphosphate, triphenylphosphite, hexamethylphosphoric acid triamide and triphenylthiophosphite.

The nitrogen-containing compound includes an amine such as triethylamine, tetramethyl ethylenediamine, piperazine, pyridine or piperidine, or its derivatives; a nitroso compound such as an N-oxide of a tertiary amine, a pyridine or a quinoline; urea or its derivatives, an urethane, a fatty acid amide, a lactam, an imido, a carbamate, an ester of glycine, and an ester of alanine.

The sulfur-containing compound includes a thioether such as diethylthioether or dibutylthioether, and a metal salt of sulfonic acid such as sodium benzene sulfonate or sodium toluene sulfonate.

Among them, a trialkyl, trialkoxy, triaryl or triaryloxyphosphine, an ester of carboxylic acid, an N-substituted phosphoric acid amide, an N-substituted diamine, a trialkylamine and a triarylphosphine oxide are preferred. Particularly preferred is an ester, and more preferred is an aromatic ester.

The silicon compound (C) is a compound represented of the formula $Si(OR^3)$ wherein $R^3$ is an alkyl group, an aryl group or an aralkyl group. Specifically, it includes tetramethoxysilane, tetraethoxysilane, tetrapropoxysilane, tetrabutoxysilane, tetra(2-ethylhexoxy)silane, tetraphenoxysilane, tetra(p-methylphenoxy)silane and tetra(benzyloxy)silane.

The titanium compound (D) includes titanium tetrachloride, titanium tetrabromide and titanium tetraiodide and a titanium halide-alcoholate compound.

In the method of the present invention, the components (A), (B), (C) and (D) may be contacted in the presence or absence of a hydrocarbon solvent.

The amounts of the respective components used for the process for the production of the catalyst, by molar ratios, are usually as follows.

$Mg(OR^1)_n(OR^2)_{2-n}$: 1
Electron donative compound: 10-0.01, preferably 1-0.1
Silicon compound: 10-0.01, preferably 5-0.1
Titanium compound: 100-0.1, preferably 40-1

The amounts of the respective components are adjusted so that the titanium content in the resulting product will be usually within a range of from 0.1 to 10% by weight, preferably from 0.5 to 5% by weight.

The reaction in the presence or absence of an inert hydrocarbon solvent is conducted usually at a temperature of from room temperature to 200 preferably from 60 to 150° C. for a period of from 0.5 to 4 hours.

The component (A) may be treated with the components (B), (C) and (D) in any optional order. It is preferred to employ a method wherein the treatment of the component (A) with the components (B) to (D) is followed by further treatment with the components (B) to (D). For example, it is preferred to employ a method wherein a process comprising contacting the components (A), (B), (C) and (D), then washing them with an inert hydrocarbon solvent, contacting and mixing thereto additional components (B), (C) and (D), or additional components (B) and (D), under heating and washing the mixture with an inert hydrocarbon solvent, is repeated at least once.

In the present invention, the order of the reaction of the components (A) to (D) is optional, as mentioned above. However, particularly preferred is a method wherein the magnesium compound (A) is first reacted with the silicon compound (C), followed by the treatment with the electron donative compound (B) and the titanium compound (D). According to this method, the components (A) and (C) are first reacted in the presence or absence of an inert hydrocarbon solvent. The reaction temperature is usually within a range of from 60° to 200° C., perferably from 100° to 150° C. The reaction time is usually with the range of from 0.5 to 4 hours. In such a case, it is preferred to employ a technique wherein a compound having the formula $R^7OH$ wherein $R^7$ is an alkyl group, an aryl group or an aralkyl group, is reached for alcohol exchange. The compound of the formula $R^7OH$ includes an alcohol such as ethanol, butanol, hexanol, 2-ethylhexanol or benzylalcohol, and a phenol such as phenol, cresol, xylenol or butylphenol. The heat reaction product thus obtained, is then treated with a halogen-containing titanium compound (D) and an electron donative compound (B) in the presence or absence of an inert hydrocarbon solvent, to obtain a solid catalyst component (a). The treatment with components (B) and (D) may be conducted by a method wherein the above heat reaction product is treated with the components (B) and (D), or a method wherein the reaction product is treated first with the component (D) and then with the component (B), or a method wherein the reaction product is treated first with the component (B) and then with the component (D). It is also possible to employ a method wherein the reaction for the production of the above-mentioned heat reaction product is conducted in the presence of the component (B), and the product is then treated with the component (D). Further, it is preferred to repeat the treating steps with the components (B) and (D) at least twice. The treatment of the heat reaction product with the components (B) and (D) may be conducted in the presence or absence of an inert solvent. The treating temperature is usually within a range of from room temperature to 200° C., preferably from 50° C. to 200° C., more preferably from 60° C. to 50° C. Prior to this treatment, the heat reaction product is preferably contacted with the components (B) and (D) usually at a temperature of from −70° C. to 50° C., preferably from −30° C. to 30° C. By this pretreatment, the entire system is likely to form a uniform liquid. It is possible to obtain a solid catalyst component having good granularity by heating this uniform liquid to precipitate solid.

In the present invention, the reaction product thus obtained, is then washed with an inert hydrocarbon solvent to remove the components soluble in the solvent. By using a catalyst system obtained by mixing the catalytic component (a) thus obtained, with (b) an organometallic compound of a metal of Groups I-III, and if necessary, (c) an electron donative compound, an olefin is polymerized or copolymerized to obtain a polyolefin.

The organometallic compound [Component (b)] of a metal of Groups I-III of the Periodic Table to be used in this catalyst system, includes compounds represented by the formula $AlR^7_nX_{3-n}$, wherein $R^7$ is a hydrocarbon group having from 1 to 20 carbon atoms, particularly an aliphatic hydrocarbon group, X is a halogen atom, and n is a number of 2 to 3. Specific examples of such organic aluminum compounds include triethylaluminum, tripropylaluminum, triisobutylaluminum, trihexylaluminum, trioctylaluminum, monovinyldiethylaluminum and diethylaluminum monochloride. Preferred is a trialkylaluminum or its mixture with a dialkylaluminum monohalide.

As the catalyst component (c) the component (B) used for the preparation of the solid catalyst component (a) may be employed. However, it is preferred to employ an ester. Particularly preferred is an aromatic ester.

With respect to the proportions of the components of the catalyst, the molar ratio of titanium in the catalyst component (a):the aluminum compound of the component (b): the electron donative compound of the component (c) is selected to be 1:3–500:0–100, preferably 1:20–200:3–50.

The olefin may be ethylene, propylene, butene-1, 3-methylbutene-1 or 4-methylpentene-1. An α-olefin having at least 3 carbon atoms is preferred. Particularly preferred is a propylene. The polymerization may be homopolymerization, or random or block copolymerization.

The polymerization reaction is preferably conducted in a slurry polymerization system by using as the solvent, hexane, heptane, cyclohxane, benzene, toluene, pentane, butane or a mixture thereof, or a liquefied form of the α-olefin to be polymerized. However, the polymerization can be conducted also in a vapor phase. The temperature is usually within a range of from 50° C. to 100° C., preferably from 60° C. to 90° C. The pressure is not critical, and is usually selected within a range of from atmospheric pressure to 100 atm.

Further, hydrogen may be present as a molecular weight controlling agent in the polymerization system, whereby a polymer having a melt flow index (MFI, measured in accordance with ASTM D-1238) of from 50 to 0.1 can readily be prepared. Other techniques commonly employed for the polymerization or copolymerization of an α-olefin, may be applicable to the method of the present invention. For instance, the α-olefin may be pretreated by using the three components (a), (b) and (c) or the two components (a) and (b) of the above-mentioned catalyst.

According to the present invention, a polymer of an α-olefin having excellent stereo regularity and granularity can be prepared at a high polymerization activity, and thus, the present invention is very useful from the industrial point of view.

Now, the present invention will be described in further detail with reference to Examples. However, it should be understood that the present invention is by no means restricted to such specific Examples.

In the Examples, the polymerization activity (represented by K) is the amount (g) of the polymer produced per hour, per an α-olefin pressure of 1 kg/cm$^2$ and per 1 g of the solid catalyst component (a) or titanium, and the catalyst efficiency (represented by CE) is the amount (g) of the polymer produced per 1 g of the solid catalyst component (a) or titanium. The isotactic index (represented by II) is the residual amount (% by weight) after the extraction with boiling n-heptane for 6 hours by means of an improved Soxhlet extractor. Non-crystalline polymer is soluble in boiling n-heptane, and therefore, II indicates the yield of the crystalline polymer. The bulk density (represented by $\rho$pB with a unit of g/cc) was measured in accordance with JIS K-6721. The melt flow index (represented by MFI) was measured in accordance with ASTM-D-1238.

The particle size distribution of the polymer was measured by means of standard sieves manufactured by Mitamura Riken Inc.

EXAMPLE 1

(A) Preparation of a catalyst

Into a 300 ml flask equipped with a stirrer and a thermometer, 5 g of commercially available Mg(OC$_2$H$_5$)$_2$ was introduced under a nitrogen atmosphere, and 83 g of TiCl$_4$, 8.7 g of tetraphenoxysilane and 1.3 g of ethyl benzoate were added thereto under a nitrogen atmosphere. The mixture was gradually heated under stirring, and after the temperature reached 80° C., the mixture was maintained at that, temperature for 2 hours. The mixture was washed with purified toluene to obtain a solid product.

Then, 83 g of TiCl$_4$ and 1.3 g of ethyl benzoate were added thereto, and the solid product was treated at 80° C. for 2 hours. Then, the product was thoroughly washed with purified toluene to obtain a solid catalyst. The amount of Ti supported on the catalyst was 2.3% by weight.

(B) Polymerization of propylene

Into a 2 liter induction-stirring autoclave thoroughly flushed with purified argon, 1.0 mmol of triethylaluminum and 0.3 mmol of methyl p-methylbenzoate were introduced under an argon atmosphere at room temperature, and H$_2$ was introduced at room temperature to a level of 1.0 kg/cm$^2$. Then, 700 g of liquefied propylene was added thereto. After an addition of 20 mg of the above solid catalyst, the system was heated to 70° C., and polymerization was conducted for 1 hour. Thereafter, excess propylene was purged to obtain 450 g of polypropylene as white powder including all the atactic polypropylene. The catalyst efficiency CE was 980 kg-PP/g-Ti (22,500 g-PP/g-cat.), and the polymerization activity K was 32,600/g-Ti (750/g-cat.). The bulk density $\rho$B was 0.43 g/cc, II was 96.5%, and MFI was 6.0.

The particle size distribution of the polymer was measured, and it wa found that the content of fine powder of 100 $\mu$m or less was 0.3% by weight based on the total amount.

EXAMPLE 2

Into the same type of an autoclave as used in Example 1 (B), 1.0 mmol of triethylaluminum and 0.3 mmol of methyl p-methylbenzoate were introduced under an argon atmosphere at room temperature, and H$_2$ was introduced at room temperature to a level of 1.0 kg/cm$^2$. Then, 700 g of liquefied propylene was added thereto, the mixture was heated under stirring, and 20 mg of the above solid catalyst was added at 70° C. to initiate polymerization. The reaction system was maintained at 70° C. for 1 hour, and then excess propylene was purged to obtain 380 g of polypropylene as white powder. The catalyst efficiency CE was 830 kg-PP/g-Ti (19,000 g-PP/g-cat.) and the polymerization activity K was 27,500/g-Ti (633/g-cat.). The bulk density $\rho$B was 0.42 g/cc, II was 93.0%, and MFI was 7.9.

EXAMPLE 3

A solid catalyst was prepared in the same manner as in Example 1 (A) except that 4.5 g of tetraethoxysilane was used as a silicon compound in Example 1 (A). The amount of Ti supported on the catalyst was 2.2% by weight. The polymerization of propylene was conducted in the same manner as in Example 1(B), whereby the catalyst efficiency CE=730 kg-PP/g-Ti (16,060 g-PP/g-cat.), the polymerization activity K=24,200/g-Ti (535/g-cat.), $\rho$B=0.43 g/cc, II=97.0%, and MFI=5.5.

EXAMPLE 4

A solid catalyst was prepared in the same manner as in Example 1(A) except that 14 g of tetrabutoxysilane was used as a silicon compound in Example 1(A). The amount of Ti supported on the catalyst was 2.5% by weight. The polymerization of propylene was conducted in the same manner as in Example 1(B), whereby the catalyst efficiency CE=700 kg-PP/g-Ti (17,500 g-PP/g-cat.), the polymerization activity K=23,200/g-Ti (583/g-cat.), $\rho$B=0.40 g/cc, II=95.3%, and MFI=3.5.

COMPARATIVE EXAMPLE 1

A solid catalyst was prepared in the same manner as in Example 1(A) except that 9.2 g of phenyl trichlorosilane was used as a silicon compound in Example 1(A). The polymerization of propylene was conducted in the same manner as in Example 1(B), whereby the catalyst efficiency CE=510 kg-PP/g-Ti (12,750 g-PP/g-cat.), the polymerization activity K=17,000/g-Ti (425/g-cat.), $\rho$B=0.40 g/cc, II=94.5%, and MFI=2.0. The particle size distribution of the polymer was measured, and it was found that the content of fine powder of 100 $\mu$m or less was 8.0% by weight of the total amount.

EXAMPLE 5

Into the same type of a flask as used in Example 1(A), 5 g of commercially available $Mg(OC_2H_5)_2$ was introduced under a nitrogen atmosphere, and 83 g of $TiCl_4$, 8.7 g of tetraphenoxysilane and 1.3 g of ethyl benzoate were added thereto at room temperature. The mixture was gradually heated under stirring, and when the temperature reached 110° C., the mixture was maintained at the same temperature for 2 hours. Then, the mixture was thoroughly washed with purified toluene to obtain a solid catalyst. The amount of Ti supported on the catalyst was 3.5% by weight.

The polymerization of propylene was conducted in the same manner as in Example 1(B), whereby the catalyst efficiency CE=471 kg-PP/g-Ti (16,500 g-PP/g-cat.), the polymerization activity K=15,710/g-Ti (550/g-cat.), $\rho$B=0.39 g/cc, II=93.5%, and MFI=9.5%. The content of fine powder of 100 $\mu$m or less was 0.3% by weight of the total amount.

COMPARATIVE EXAMPLE 2

A solid catalyst was prepared in the same manner as in Example 1(A) except that tetraphenoxysilane was not employed in Example 1(A). The amount of Ti supported on the catalyst was 2.8% by weight.

The polymerization of propylene was conducted in the same manner as in Example 1(B), whereby the catalyst efficiency CE=143 kg-PP/g-Ti (4,000 g-PP/g-cat.), the polymerization activity K=4.760 g-Ti (133/g-cat.), $\rho$B=0.35 g/cc, II=92.6%, and MFI=5.8. The content of fine powder of 100 $\mu$m or less was 9.2% by weight of the amount.

EXAMPLE 6 (1) Preparation of a solid catalyst component

Into a 500 ml flask equipped with a stirrer and a thermometer, 5 g of commercially available $Mg(OC_2H_5)_2$ was introduced under a nitrogen atmosphere, and a toluene solution of 8.8 g of tetraphenoxysilane was added thereto at room temperature. The mixture was heated and reacted at 130° C. for 2 hours. The reaction product was a white solid slurry. After the reaction, 67 ml of purified toluene was added thereto, and the mixture was cooled to −20° C. Then, 17 g of $TiCl_4$ was added thereto at −20° C. After the addition, the temperature was gradually raised, and after the temperature reached 80° C., 1.3 g of ethyl benzoate was added thereto, and the mixture was maintained at 80° C. for 1 hour. Then, the product was washed with purified toluene to obtain a solid product. Thereafter, 82 g of $TiCl_4$ and 1.3 g of ethyl benzoate were added thereto, and the solid product was treated at 80° C. for 1 hour. The product was then washed with purified toluene to obtain 4.8 g of a solid catalyst component. The Ti content in this catalyst component was 2.5% by weight.

(2) Polymerization of propylene

Into a 2 liter induction-stirring autoclave thoroughly flushed with purified argon, 1.0 mmol of triethylaluminum and 0.3 mmol of methyl p-methylbenzoate were introduced under an argon atmosphere at room temperature, and $H_2$ was introduced at room temperature to a level of 1.0 kg/cm$^2$. Then, 700 g of liquefied propylene was added thereto. After an addition of 15 mg of the above solid catalyst component, the system was heated to 70° C., and polymerization was conducted at 70° C. for 1 hour. Thereafter, excess propylene was purged to obtain 270 g of polypropylene powder. The catalyst efficiency CE was 18,000 g-PP/g-cat., and the polymerization activity K was 600/g-cat. The bulk density $\rho$B was 0.40 g/cc, II was 96.8%, and MFI was 6.5.

The particle size distribution of the polymer was narrow, and it was found that the content of powder having a particle size of from 400 to 150 $\mu$m was 92% by weight based on the total amount, and the content of fine powder of 100 $\mu$m or less was 0.5% by weight.

EXAMPLE 7

A solid catalyst component was prepared in the same manner as in Example 6(1) except that 7.5 g of $Mg(OC_4H_9)_2$ was used as a magnesium compound, and the amount of purified toluene added after the reaction was changed to 62 ml. The Ti content in this catalyst component was 2.7% by weight. The polymerization of propylene was conducted in the same manner as in Example 6(2), whereby the catalyst efficiency CE=16,500 g-PP/g cat., the polymerization activity K=550/g-cat., $\rho$B=0.41 g/cc, II=97.7%, and MFI=5.2.

The particle size distribution of the polymer thus obtained was measured, and it was found that the content of powder having a particle size of from 600 to 250 $\mu$m was 91% based on the total amount, and the content of fine powder of 100 $\mu$m or less was 0.1% by weight.

EXAMPLE 8

A solid catalyst component was prepared in the same manner as in Example 6(1) except that 7.0 g of tetrabutoxysilane and 8.7 g of tetraphenoxysilane were used as silicon compounds, and the amount of the $TiCl_4$ added for the first time was changed to 25 g. The Ti content was 2.9% by weight. The polymerization of propylene was conducted in the same manner as in Example 6(2), whereby the catalyst efficiency CE=19,500 g-PP/g-cat., the polymerization activity K=650/g-cat., $\rho B$=0.42 g/cc, II=96.5%, and MFI=7.3.

The particle size distribution of the polymer thus obtained was measured, and it was found that the content of powder having a particle size of from 700 to 300 μm was 92% by weight based on the total amount, and the content of fine powder of 100 μm or less was 0.1%.

EXAMPLE 9

In the same manner as in Example 6(1), 5 g of commercially available $Mg(OC_2H_5)_2$ was introduced into a flask, and a toluene solution of 8.8 g of tetraphenoxysilane and 6.5 g of n-butanol were added. The mixture was gradually heated, and reacted at 100° C. for 1 hour, and then at 130° C. for 1 hour. During the reaction, distillation of ethanol was observed. The reaction product thus obtained was a white solid slurry.

To this reaction product, 58 ml of purified toluene was added. Then, the mixture was cooled to −20° C., and 25 g of $TiCl_4$ was added. After the addition, the temperature was raised to 80° C. over a period of 1 hour, and 1.3 g of ethyl benzoate was added at 80° C. The mixture was held at 80° C. for 1 hour. Thereafter, the product was washed with purified toluene to obtain a solid product. This solid product was treated with $TiCl_4$ and ethyl benzoate, and then washed with purified toluene in the same manner as in Example 6(1) to obtain a solid catalyst component. The Ti content in this catalyst component was 2.7% by weight.

By using the solid catalyst component thus obtained, the polymerization of propylene was conducted in the same manner as in Example 6(2), whereby the catalyst efficiency CE=18,900 g-PP/g-cat., the polymerization activity K=630/g-cat., $\rho B$=0.40 g/cc, II=96.2%, and MFI=9.5.

The particle size distribution of the polymer thus obtained was measured, and it was found that the content of powder having a particle size of from 300 to 100 μm was 97% by weight based on the total amount, and the content of fine powder of 100 μm or less was 1.1% by weight.

EXAMPLE 10

A solid catalyst component was prepared in the same manner as in Example 9 except that 7.0 g of tetrabutoxysilane and 8.8 g of tetraphenoxysilane were used as silicon compounds, and the amount of purified toluene added was changed to 65 ml. The Ti content in the solid catalyst component thus obtained was 2.8% by weight.

The polymerization of propylene was conducted in the same manner as in Example 6(2), whereby the catalyst efficiency CE=22,800 g-PP/g-cat., the polymerization activity K=760/g-cat., $\rho B$=0.41 g/cc, II=97.0%, and MFI=3.5.

The particle size distribution of the polymer thus obtained was measured, and it was found that the content of powder having a particle size of from 400 to 200 μm was 92% by weight based on the total amount, and the content of fine powder of 100 μm or less was 0.1% by weight.

EXAMPLE 11

A white solid slurry reaction product was prepared in the same manner as in Example 9 by using 5 g of commercially available $Mg(OC_2H_5)_2$, 7.0 g of tetrabutoxysilane, 4.6 g of tetraethoxysilane, and 8.2 g of phenol. To this reaction product, 62 ml of purified toluene was added. Then, the mixture was cooled to −20° C., and 25 g of $TiCl_4$ was added thereto to obtain a uniform solution. After the addition, the mixture was gradually heated to 80° C. over a period of 1 hour. During the heating, formation of solid particles was observed. Then, 1.3 g of ethyl benzoate was added at 80° C., and the mixture was held at the same temperature for 1 hour. Thereafter, the product was washed with purified toluene to obtain a solid product. The subsequent operation was conducted in the same manner as in Example 6(1) to obtain a solid catalyst component. The Ti content in this catalyst component was 2.7% by weight.

By using this solid catalyst component, the polymerization of propylene was conducted in the same manner as in Example 6(2), whereby the catalyst efficiency CE=22,500 g-PP/g-cat., the polymerization activity K=750/g-cat., $\rho B$=0.42 g/cc, II=96.6%, and MFI=6.3.

The particle size distribution of the polymer thus obtained was measured, and it was found that the content of power having particle size of from 400 to 150 μm was 94% by weight based on the total amount, and the content of fine powder of 100 μm or less was 0.2% by weight.

EXAMPLE 12

In the same manner as in Example 6(1), a white solid slurry reaction product of a magnesium compound and a silicon compound was obtained. By using the reaction product, a solid catalyst component was prepared in the same manner as in Example 6(1) except that the amount of purified toluene added was changed to 73 ml, and 32 g of a Ti compound represented by the formula $Ti(OBu)_{0.5}Cl_{3.5}$ was used instead of $TiCl_4$. The Ti content in this catalyst component was 2.5% by weight.

The polymerization of propylene was conducted in the same manner as in Example 6(2), whereby the catalyst efficiency CE=18,900 g-PP/g-cat., the polymerization activity K=630/g-cat , $\rho B$=0.42 g/cc, II=97.0%, and MFI=4.5.

The particle size distribution of the polymer thus obtained was measured, and it was found that the content of powder having a particle size of from 300 to 150 μm was 96% by weight based on the total amount, and the content of fine powder of 100 μm or less was 0.3% by weight.

We claim:

1. A method for producing an olefin polymer, which comprises polymerizing or copolymerizing propylene in the presence of a catalyst comprising (a) a titanium-containing solid catalyst component, (b) an organometallic compound of a metal of Groups I-III of the Periodic Table and an electron donative compound (c), said solid catalyst component (a) being obtained by treating (A) a magnesium compound of the formula $Mg(OR^1)_n(OR^2)_{2-n}$ wherein each of $R^1$ and $R^2$ is an alkyl group, an aryl group or an aralkyl group, and n is $2 \geq n \geq 0$, with (B) an ester of carboxylic acid as electron donative compound, (C) a silicon compound of the formula $Si(OR^3)_4$ wherein $R^3$ is an alkyl group, an aryl group or an aralkyl group and (D) a titanium compound which is titanium tetrachloride, titanium tetrabromide, titanium tetraiodide or a titanium halide-alcoholate, the amount of said titanium compound (D) being 1–40 mol per mol of said magnesium compound (A), the amount of said silicon compound (C) being 0.01–10 mol per mol of said magnesium compound (A), and the amount of said ester electron donative compound (B) being 0.01–10 mol per mol of said magnesium compound (A).

2. The method according to claim 1, wherein the titanium-containing solid catalyst component (a) is obtained by contacting and reacting a solid obtained by contacting and reacting (A) a magnesium compound of the formula $Mg(OR^1)_n(OR^2)_{2-n}$, (B) said ester electron donative compound, (C) a silicon compound of $Si(OR^3)_4$ and (D) the titanium compound, with (B) said ester electron donative compound and (D) the titanium compound, or with (B) said ester electron donative compound, (D) the titanium compound and (C) a silicon compound of the formula $Si(OR^3)_4$.

3. The method according to claim 1 or 2, wherein the temperature for the reaction to obtain the titanium-containing solid catalyst component (a) is within a range of from room temperature to 200° C.

4. The method according to claim 1 or 2, wherein the temperature for the reaction to obtain the titanium-containing solid catalyst component (a) is within a range of from 60° to 150° C.

5. The method according to claim 1, wherein the titanium-containing solid catalyst component (a) is obtained by heating and reacting (A) a magnesium compound of the formula $Mg(OR^1)_n(OR^2)_{2-n}$ and (C) a silicon compound of the formula $Si(OR^3)_4$, and then treating the reaction product with (B) said ester electron donative compound and (D) said titanium compound.

6. The method according to claim 5, wherein the temperature for treating the reaction product of the magnesium compound (A) and the silicon compound (C), with the ester electron donative compound (B) and the titanium compound (D) is within a range of from −70° to +50° C.

7. The method according to claim 1 or 2, wherein the silicon compound (C) is selected from the group consisting of tetramethoxysilane, tetraethoxysilane, tetrapropoxysilane, tetrabutoxysilane, tetra(2-ethylhexoxy)silane, tetraphenoxysilane and tetra(p-methylphenoxy)silane.

8. The method according to claim 1 or 2, wherein the silicon compound (C) is selected from the group consisting of tetraphenoxysilane, tetraethoxysilane and tetrabutoxysilane.

9. The method according to claim 1 or 2, wherein the magnesium compound (A) is selected from the group consisting of a dialkoxymagnesium, a diaryloxymagnseium, a diaralkyoxymagnesium and an alkoxyaryloxymagnesium.

* * * * *